United States Patent Office 3,309,168  
Patented Mar. 14, 1967

3,309,168  
PEROVSKITES  
Gerhard Bayer, Hinteregg, Zurich, Switzerland, assignor to Owens-Illinois, Inc., a corporation of Ohio  
No Drawing. Filed May 6, 1963, Ser. No. 278,485  
12 Claims. (Cl. 23—50)

This invention relates to new crystalline compounds containing hexavalent tellurium and having a perovskite crystalline structure.

I have discovered that hexavalent tellurium can exist in crystalline compounds in 6-fold coordination. Insofar as I can learn from published literature, this fact was not previously known before my discovery thereof. More specifically, I have now discovered new dielectric perovskite type crystalline compounds wherein hexavalent tellurium has 6-fold coordination, said compounds having the general formula $$A_2^{2+}BTeO_6$$

where $A^{2+}$ is at least one member selected from the group consisting of $Ca^{2+}$, $Sr^{2+}$, $Ba^{2+}$ and $Pb^{2+}$, and B is at least one member selected from the group consisting of $Ca^{2+}$, $Cd^{2+}$, $Zn^{2+}$, $Co^{2+}$, $Cu^{2+}$, $Ni^{2+}$ and $Mg^{2+}$. There is the further limitation that the crystals or crystalline compounds contain, for each atom of Te, (1) not more than two atoms of Ca and (2) not more than one atom of Ca for each atom of Cd.

In the Formula $A_2$ represents two atoms of any of the listed A ions or a total of two atoms of any combination of the listed A ions. Similarly, B represents one atom of any of the B ions, or a total of one atom of any combination of B ions.

My new perovskites are dielectric materials useful where materials having relatively high dielectric constants are commonly used. Also, many of my new perovskites are ferroelectric.

Specific examples of such perovskites are $Sr_2MgTeO_6$, $Sr_{0.5}Ba_{1.5}NiTeO_6$, $Pb_{1.3}Sr_{0.7}Ni_{0.5}Co_{0.5}TeO_6$, $Ca_2MgTeO_6$, $BaCaNiTeO_6$, $Ba_2CdTeO_6$, $PbSrCuTeO_6$, $Sr_2ZnTeO_6$, $BaCa_2TeO_6$, $Ba_{1.5}Ca_{0.5}Cd_{0.5}Zn_{0.5}TeO_6$, $Pb_2MgTeO_6$, $SrCaNiTe_2O_6$, $Pb_2CaTeO_6$, $Ba_2MgTeO_6$, $Pb_{0.3}Ca_{1.7}MgTeO_6$, $Ba_2ZnTeO_6$, $Ba_{0.5}Pb_{0.5}SrCa_{0.5}Cu_{0.2}Ni_{0.3}$, $Ba_2CoTeO_6$, $Ba_2CaTeO_6$, $PbSrMgTeO_6$ and $PbBaMgTeO_6$.

The compounds of the invention can be prepared by mixing stoichiometric proportions of the $A^{2+}$ oxide or oxides and the $B^{2+}$ oxide or oxides, and $TeO_2$ in finely divided form. The powders, as stated, are intimately admixed, pressed to a cohesive shape, and then fired in an oxidizing (air) atmosphere by heating slowly up to 700° C. where they are held for about 4 to 8 hours. In the case of strontium and barium I have actually used carbonates and nitrates instead of the oxides. Also, such salts can be used in the case of the other ions, as will be understood. During the firing up to 700° C. and holding at this temperature, most of the $TeO_2$ is oxidized to the hexavalent state and nitrates are decomposed; also some decomposition of carbonates takes place. Thereafter the temperature is slowly raised to about 900° C. in the case of the lead-containing materials and held there for 20 hours or to about 1000° C. in the case of the other materials and held there for 20 hours, and then cooled. Although not absolutely necessary, in the actual work done by me, the compositions were cooled to room temperatures following the 700° C. heat treatment and were reground and then thoroughly mixed with the additions of acetone and again pressed to a cohesive form prior to the final heat treatment just described.

In a representative specific example, the tetragonal perovskite $Sr_2ZnTeO_6$ was prepared by mixing SrO, ZnO, and $TeO_2$ in proportions of one mole each of $TeO_2$ and ZnO to two moles of SrO, all having a particle size of less than 20 mesh. The powders were very intimately admixed and then pressed into disks of 20 mm. in diameter, using 2–3 grams of the fine powders. Thereafter they were fired slowly up to 700° C. and held there for about 5 hours. They were then cooled to room temperature, reground, again thoroughly mixed with the addition of acetone, and pressed into disks and then slowly heated up to 1000° C. where they were held for 20 hours before cooling to room temperature. X-ray powder diffraction data was obtained on the compound, and the tetragonal perovskite compound had lattice constants, a=7.91 A, c=7.96 A. The product was white. Some of the other compounds prepared in the manner just described showed no detectable deviation from cubic symmetry; the lattice constant of $PbSrMgTeO_6$ was 7.96, the lattice constant of $PbBaMgTeO_6$ was 8.08, that of $Sr_2MgTeO_6$ was 7.91, that of $Ba_2MgTeO_6$ was 8.12, that of $Ba_2CoTeO_6$ was 8.22, that of $Ba_2ZnTeO_6$ was 8.27, that of $Ba_2CaTeO_6$ was 8.37 and the lattice constant of $Pb_2MgTeO_6$ was 7.97. Some of the other perovskites showed small deviations from the cubic structure, while a few of the perovskites are distorted perovskites, such as $Ca_2MgTeO_6$ and $Pb_2CaTeO_6$; for these latter two compounds the lattice constants were 7.73 and 8.28 Angstrom units, assuming a cubic structure.

In the following Table I are given typical complete X-ray powder diffraction data for some representative crystalline perovskites of the invention:

TABLE I.—LATTICE SPACINGS AND RELATIVE INTENSITIES

| hkl | $Sr_2MgTeO_6$ | | $Pb_2MgTeO_6$ | | | $PbSrMgTeO_6$ | | $PbBaMgTeO_6$ | | $Ba_2MgTeO_6$ | |
|---|---|---|---|---|---|---|---|---|---|---|---|
| | d | Int. | d | Int. | Int. (calc.) | d | Int. | d | Int. | d | Int. |
| 111 | 4.60 | 34 | 4.61 | 11 | 8 | 4.60 | 23 | 4.67 | 19 | 4.72 | 21 |
| 200 | 3.97 | 1 | 3.995 | 21 | 23 | 3.98 | 6 | 4.046 | 10 | 4.076 | 6 |
| 220 | 2.814 | 100 | 2.827 | 100 | 100 | 2.82 | 100 | 2.857 | 100 | 2.88 | 100 |
| 311 | 2.392 | 13 | 2.407 | 5 | 5 | 2.398 | 9 | 2.436 | 6 | 2.455 | 8 |
| 222 | 2.292 | 6 | 2.307 | 15 | 17 | 2.298 | 10 | 2.332 | 8 | 2.350 | 11 |
| 400 | 1.983 | 25 | 1.998 | 26 | 28 | 1.989 | 24 | 2.021 | 24 | 2.035 | 25 |
| 331 | 1.820 | 5 | 1.835 | 2 | 2 | 1.824 | 3 | 1.852 | 2 | 1.866 | 3 |
| 420 | | | 1.787 | 8 | 10 | 1.778 | 2 | 1.807 | 4 | 1.817 | 3 |
| 422 | 1.620 | 24 | 1.632 | 30 | 40 | 1.623 | 25 | 1.650 | 25 | 1.661 | 28 |
| 333 511 | } 1.526 | 3 | 1.536 | 1 | 1 | 1.530 | 2 | 1.556 | 2 | 1.568 | 3 |
| 440 | 1.402 | 13 | 1.413 | 13 | 17 | 1.406 | 10 | 1.429 | 10 | 1.438 | 12 |
| 531 | 1.340 | 3 | 1.352 | 1 | 1 | 1.344 | 2 | 1.366 | 2 | 1.375 | 2 |
| 442 600 | } | | 1.332 | 3 | 5 | | | 1.347 | 1 | 1.357 | 1 |
| 620 | 1.253 | 8 | 1.265 | 11 | 17 | 1.256 | 7 | 1.277 | 7 | 1.287 | 9 |
| 622 | | | 1.206 | 3 | 6 | 1.199 | 1 | 1.218 | 1 | 1.227 | 1 |
| 444 | 1.145 | 3 | 1.154 | 3 | 6 | 1.149 | 3 | 1.166 | 2 | 1.175 | 3 |
| | a=7.94±0.01 A | | a=7.99 A | | | a=7.955 A | | a=8.08 A | | a=8.14 A | |

Space group $O_h^5$—F m3m, Z=4.

It happens that, in addition to their dielectric properties, the compounds of the invention are all white or colored pigments of very good coloring covering power when finely divided. They can be employed as pigments in ceramic glazes, enamels, paints and dyes. They are also useful as pigments in plastics and can be incorporated therein as powders in such plastics as polyethylene or polystyrene, in amounts from 0.5 to 10 weight percent, or even higher, where desired.

Most of the compounds of the invention can form solid solutions with other compounds of the invention and in many cases with other perovskites of the type $ABO_3$.

As will be evident to those skilled in the art, various modifications of this invention can be made or followed in the light of the foregoing disclosure and discussion, without departing from the spirit and scope of the disclosure or from the scope of the claims.

I claim:

1. A crystalline perovskite having the general formula $$A_2^{2+}BTeO_6$$

where $A^{2+}$ is at least one member selected from the group consisting of $Ca^{2+}$, $Sr^{2+}$, $Ba^{2+}$ and $Pb^{2+}$, and B is at least one member selected from the group consisting of $Ca^{2+}$, $Cd^{2+}$, $Zn^{2+}$, $Co^{2+}$, $Cu^{2+}$, $Ni^{2+}$ and $Mg^{2+}$, with the proviso that there is present, for each atom of Te, (1) not more than two atoms of Ca and (2) not more than one atom of Ca for each atom of Cd.

2. A crystalline perovskite having the formula $$Sr_2ZnTeO_6$$

3. A crystalline perovskite having the formula $$Sr_2MgTeO_6$$

4. A crystalline perovskite having the formula $$Ca_2MgTeO_6$$

5. A crystalline perovskite having the formula $$Ba_2MgTeO_6$$

6. A crystalline perovskite having the formula $$Ba_2CoTeO_6$$

7. A crystalline perovskite having the formula $$Ba_2ZnTeO_6$$

8. A crystalline perovskite having the formula $$Ba_2CaTeO_6$$

9. A crystalline perovskite having the formula $$Pb_2MgTeO_6$$

10. A crystalline perovskite having the formula $$Pb_2CaTeO_6$$

11. A crystalline perovskite having the formula $$PbSrMgTeO_6$$

12. A crystalline perovskite having the formula $$PbBaMgTeO_6$$

References Cited by the Examiner

UNITED STATES PATENTS

| | | | |
|---|---|---|---|
| 2,691,738 | 10/1954 | Matthais | 23—51 X |
| 3,022,186 | 2/1962 | Hund | 106—288 X |
| 3,034,857 | 5/1962 | Brixner | 23—51 |
| 3,035,896 | 5/1962 | Brixner | 23—51 |

OTHER REFERENCES

Bayer, Journal of the American Ceramic Society, vol. 46, No. 12, December 1963, pages 604 and 605.

Wold et al., Journal of the American Chemical Society, vol. 76, No. 4, February 1954, pages 1029 and 1030.

OSCAR R. VERTIZ, *Primary Examiner.*

H. T. CARTER, *Assistant Examiner.*